(12) United States Patent
Grigg et al.

(10) Patent No.: US 10,121,142 B2
(45) Date of Patent: Nov. 6, 2018

(54) USER AUTHENTICATION BY TOKEN AND COMPARISON TO VISITATION PATTERN

(71) Applicant: BANK OF AMERICA CORPORATION, Charlotte, NC (US)

(72) Inventors: David M. Grigg, Rock Hill, SC (US); Richard Andrew Starbuck, Walnut Creek, CA (US); Carrie Anne Hanson, Charlotte, NC (US); Alicia C. Jones, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 901 days.

(21) Appl. No.: 14/251,291

(22) Filed: Apr. 11, 2014

(65) Prior Publication Data
US 2015/0294306 A1  Oct. 15, 2015

(51) Int. Cl.
*G06Q 20/40* (2012.01)
*G06Q 20/38* (2012.01)
*H04L 29/06* (2006.01)
*G06Q 20/02* (2012.01)
*G06Q 20/32* (2012.01)
*G06Q 20/36* (2012.01)

(52) U.S. Cl.
CPC ......... *G06Q 20/3821* (2013.01); *G06Q 20/02* (2013.01); *G06Q 20/32* (2013.01); *G06Q 20/363* (2013.01); *G06Q 20/385* (2013.01); *G06Q 20/4016* (2013.01); *H04L 63/0853* (2013.01); *H04L 63/102* (2013.01); *H04L 63/105* (2013.01); *G06Q 2220/00* (2013.01)

(58) Field of Classification Search
CPC .... G06Q 20/4016; G06Q 20/40; G06Q 20/32; G06Q 20/3224; G06Q 20/3821; G06Q 20/1085; G06Q 20/382; G06F 21/31; G06F 21/552; G06F 21/554; G06F 2221/2111; G06F 2221/2113; G06F 2221/2129
See application file for complete search history.

(56) References Cited

U.S. PATENT DOCUMENTS

| | | | |
|---|---|---|---|
| 7,195,157 B2 | 3/2007 | Swartz et al. |
| 7,349,557 B2 | 3/2008 | Tibor |
| 7,398,253 B1 | 7/2008 | Pinnell |
| 7,606,770 B2 | 10/2009 | Pinnell |
| 7,716,129 B1 | 5/2010 | Tan et al. |
| 7,908,233 B2 | 3/2011 | Angell et al. |

(Continued)

*Primary Examiner* — Christopher Stanford
(74) *Attorney, Agent, or Firm* — Michael A. Springs; Moore & Van Allen PLLC; Patrick B. Home

(57) ABSTRACT

Embodiments are directed to receiving a token from a wearable device carried by a customer, the token for user authentication based on a visitation pattern of the customer. Embodiments include receive, from the wearable device carried by the customer, the token comprising user authentication information associated with the customer, wherein receiving the token indicates a current visit of the customer to the financial institution location; access, based at least in part on the user authentication information, a visitation history from a customer profile associated with the customer; determine, based at least in part on the visitation history, whether the current visit falls within a recognized visitation pattern; and authenticate, based at least in part on the determination, the customer for performing a transaction at the financial institution location.

15 Claims, 10 Drawing Sheets

(56) References Cited

U.S. PATENT DOCUMENTS

| | | |
|---|---|---|
| 7,908,237 B2 | 3/2011 | Angell et al. |
| 8,184,070 B1 | 5/2012 | Taubman |
| 8,485,422 B2 | 7/2013 | Rometty et al. |
| 8,490,865 B2 | 7/2013 | Randazza et al. |
| 8,500,031 B2 | 8/2013 | Naelon |
| 8,559,924 B1 | 10/2013 | Henderson |
| 8,572,391 B2 * | 10/2013 | Golan ............... G06F 21/40 705/72 |
| 8,856,923 B1 * | 10/2014 | Kolman ............... 380/255 |
| 9,031,858 B2 | 5/2015 | Angell et al. |
| 9,424,575 B2 | 8/2016 | Grigg et al. |
| 2006/0074769 A1 | 4/2006 | Looney et al. |
| 2008/0128118 A1 | 5/2008 | Singhai |
| 2008/0249837 A1 | 10/2008 | Angell et al. |
| 2008/0249867 A1 | 10/2008 | Angell et al. |
| 2008/0249870 A1 | 10/2008 | Angell et al. |
| 2009/0006286 A1 | 1/2009 | Angell et al. |
| 2009/0006295 A1 | 1/2009 | Angell et al. |
| 2009/0300744 A1 | 12/2009 | Guo et al. |
| 2009/0312011 A1 | 12/2009 | Huomo et al. |
| 2010/0146263 A1 | 6/2010 | Das et al. |
| 2011/0166869 A1 | 7/2011 | Froelich et al. |
| 2012/0030043 A1 | 2/2012 | Ross et al. |
| 2012/0050144 A1 | 3/2012 | Morlock |
| 2012/0203700 A1 | 8/2012 | Ornce et al. |
| 2012/0317652 A1 | 12/2012 | Kiley |
| 2013/0042314 A1 | 2/2013 | Kelley |
| 2013/0046692 A1 * | 2/2013 | Grigg ............... G06Q 40/00 705/44 |
| 2013/0054473 A1 | 2/2013 | Jan et al. |
| 2013/0110658 A1 | 5/2013 | Lyman et al. |
| 2013/0144731 A1 * | 6/2013 | Baldwin ............... G06Q 20/20 705/17 |
| 2013/0159386 A1 | 6/2013 | Fan |
| 2013/0208234 A1 | 8/2013 | Lewis |
| 2013/0212024 A1 | 8/2013 | Mattsson et al. |
| 2013/0242262 A1 | 9/2013 | Lewis |
| 2013/0246203 A1 | 9/2013 | Laracey |
| 2013/0246258 A1 | 9/2013 | Dessert |
| 2013/0246260 A1 | 9/2013 | Barten et al. |
| 2013/0275190 A1 | 10/2013 | Rossi |
| 2014/0006190 A1 | 1/2014 | Loomis, III et al. |
| 2014/0089672 A1 * | 3/2014 | Luna ............... H04L 9/3231 713/186 |
| 2014/0108263 A1 | 4/2014 | Ortiz et al. |
| 2014/0122344 A1 | 5/2014 | Foulds et al. |
| 2014/0160157 A1 | 6/2014 | Poulos et al. |
| 2014/0172707 A1 * | 6/2014 | Kuntagod ......... G06Q 20/40145 705/44 |
| 2014/0289819 A1 * | 9/2014 | Lindemann ............ G06Q 20/42 726/5 |
| 2014/0306994 A1 | 10/2014 | Brown et al. |
| 2014/0344153 A1 | 11/2014 | Raj et al. |
| 2015/0142596 A1 | 5/2015 | Jakobson et al. |
| 2015/0143283 A1 | 5/2015 | Noda et al. |
| 2015/0293356 A1 | 10/2015 | Grigg et al. |
| 2015/0294306 A1 | 10/2015 | Grigg et al. |
| 2015/0294307 A1 | 10/2015 | Grigg et al. |
| 2015/0294322 A1 | 10/2015 | Grigg et al. |

* cited by examiner

USER AUTHENTICATION BY TOKEN AND COMPARISON TO VISITATION PATTERN

BACKGROUND

In the new technological age, the security of personal information, or the lack thereof, has become an issue that concerns many people. As a result, several business industries, such as financial institutions, have taken precautionary measures to ensure the safety and protection of their customers' information. This is typically accomplished by verifying a user's identity and/or performing various authentication procedures prior to transferring any personal information or performing a transaction.

BRIEF SUMMARY

Embodiments of the invention are directed to an apparatus for receiving a token from a wearable device carried by a customer, the token for user authentication based on a visitation pattern of the customer, the apparatus comprising a memory; a processor; and a module stored in the memory, executable by the processor, and configured to receive, from the wearable device carried by the customer, the token comprising user authentication information associated with the customer, wherein receiving the token indicates a current visit of the customer to the financial institution location; access, based at least in part on the user authentication information, a visitation history from a customer profile associated with the customer; determine, based at least in part on the visitation history, whether the current visit falls within a recognized visitation pattern; and authenticate, based at least in part on the determination, the customer for performing a transaction at the financial institution location.

In some embodiments, the module is further configured to determine, based on the determination of whether the current visit falls within the recognized visitation pattern, one of a plurality of levels of authentication, which together comprise a continuum of authentication. In some such embodiments, the current visit falls within a recognized visitation pattern; and wherein determining one of a plurality of levels of authentication comprises determining a zero level of authentication wherein authentication requires no additional credentials. In other such embodiments, the current visit falls within a recognized visitation pattern; wherein determining one of a plurality of levels of authentication comprises determining a soft level of authentication requiring authentication that is less than a full level of authentication; and wherein the soft level of authentication requires at least one additional authentication credential. In other such embodiments, the current visit falls outside a recognized visitation pattern; wherein determining one of a plurality of levels of authentication comprises determining a full level of authentication wherein the full level of authentication requires at least two additional authentication credentials. In other such embodiments, determining whether the current visit falls within a recognized visitation pattern comprises determining that the current visit is marginally outside the recognized visitation pattern; wherein determining one of the plurality of levels of authentication comprises determining a soft level of authentication requiring authentication that is less than a full level of authentication; and wherein the soft level of authentication requires at least one additional authentication credential.

In some embodiments, the visitation history comprises time information indicating when the customer typically visits the financial institution location; and wherein determining whether the current visit falls within a recognized visitation pattern comprises comparing a time, date, and/or day of the week associated with the current visit and the time information.

In some embodiments, the visitation history comprises transaction information indicating an amount of a transaction conducted when the customer visits the financial institution location; and wherein determining whether the current visit falls within a recognized visitation pattern comprises comparing a transaction amount associated with the current visit and the transaction information.

According to embodiments of the invention, a method for receiving a token from a wearable device carried by a customer, the token for user authentication based on a visitation pattern of the customer includes receiving, at an apparatus proximate a financial institution location and from the wearable device carried by the customer, the token comprising user authentication information associated with the customer, wherein receiving the token indicates a current visit of the customer to the financial institution location; accessing, by the apparatus and based at least in part on the user authentication information, a visitation history from a customer profile associated with the customer; determining, by the apparatus and based at least in part on the visitation history, whether the current visit falls within a recognized visitation pattern; and authenticating, by the apparatus and based at least in part on the determination, the customer for performing a transaction at the financial institution location. In some such embodiments, the method includes determining, by the apparatus and based on the determination of whether the current visit falls within the recognized visitation pattern, one of a plurality of levels of authentication, which together comprise a continuum of authentication. In other such embodiments, the current visit falls within a recognized visitation pattern; and wherein determining one of a plurality of levels of authentication comprises determining a zero level of authentication wherein authentication requires no additional credentials. In other such embodiments, the current visit falls within a recognized visitation pattern; wherein determining one of a plurality of levels of authentication comprises determining a soft level of authentication requiring authentication that is less than a full level of authentication; and wherein the soft level of authentication requires at least one additional authentication credential. In other such embodiments, the current visit falls outside a recognized visitation pattern; wherein determining one of a plurality of levels of authentication comprises determining a full level of authentication wherein the full level of authentication requires at least two additional authentication credentials. In other such embodiments, determining whether the current visit falls within a recognized visitation pattern comprises determining that the current visit is marginally outside the recognized visitation pattern; wherein determining one of the plurality of levels of authentication comprises determining a soft level of authentication requiring authentication that is less than a full level of authentication; and wherein the soft level of authentication requires at least one additional authentication credential.

In some embodiments, the visitation history comprises time information indicating when the customer typically visits the financial institution location; and wherein determining whether the current visit falls within a recognized visitation pattern comprises comparing a time, date, and/or day of the week associated with the current visit and the time information.

In some embodiments, the visitation history comprises transaction information indicating an amount of a transaction conducted when the customer visits the financial institution location; and wherein determining whether the current visit falls within a recognized visitation pattern comprises comparing a transaction amount associated with the current visit and the transaction information.

According to embodiments of the invention, a computer program product for receiving a token from a wearable device carried by a customer, the token for user authentication based on a visitation pattern of the customer, the computer program product comprising a non-transitory computer-readable medium comprising code causing a first apparatus to receive, from the wearable device carried by the customer, the token comprising user authentication information associated with the customer, wherein receiving the token indicates a current visit of the customer to the financial institution location; access, based at least in part on the user authentication information, a visitation history from a customer profile associated with the customer; determine, based at least in part on the visitation history, whether the current visit falls within a recognized visitation pattern; and authenticate, based at least in part on the determination, the customer for performing a transaction at the financial institution location.

In some embodiments, the code further causes the first apparatus to determine, based on the determination of whether the current visit falls within the recognized visitation pattern, one of a plurality of levels of authentication, which together comprise a continuum of authentication.

In some embodiments, the visitation history comprises time information indicating when the customer typically visits the financial institution location; and wherein determining whether the current visit falls within a recognized visitation pattern comprises comparing a time, date, and/or day of the week associated with the current visit and the time information.

In some embodiments, the visitation history comprises transaction information indicating an amount of a transaction conducted when the customer visits the financial institution location; and wherein determining whether the current visit falls within a recognized visitation pattern comprises comparing a transaction amount associated with the current visit and the transaction information.

BRIEF DESCRIPTION OF THE DRAWINGS

Figure 1:
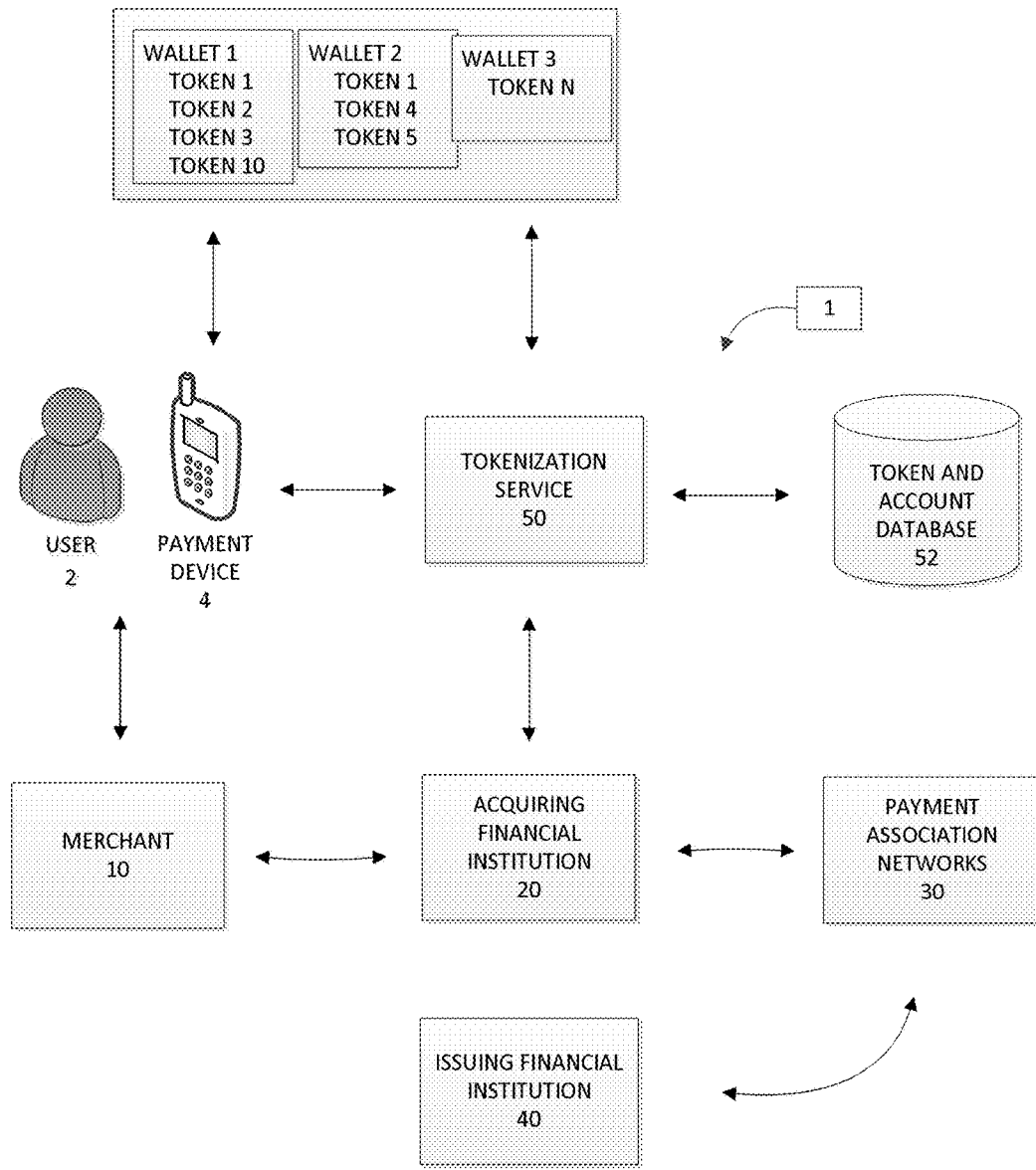
Figure 2:
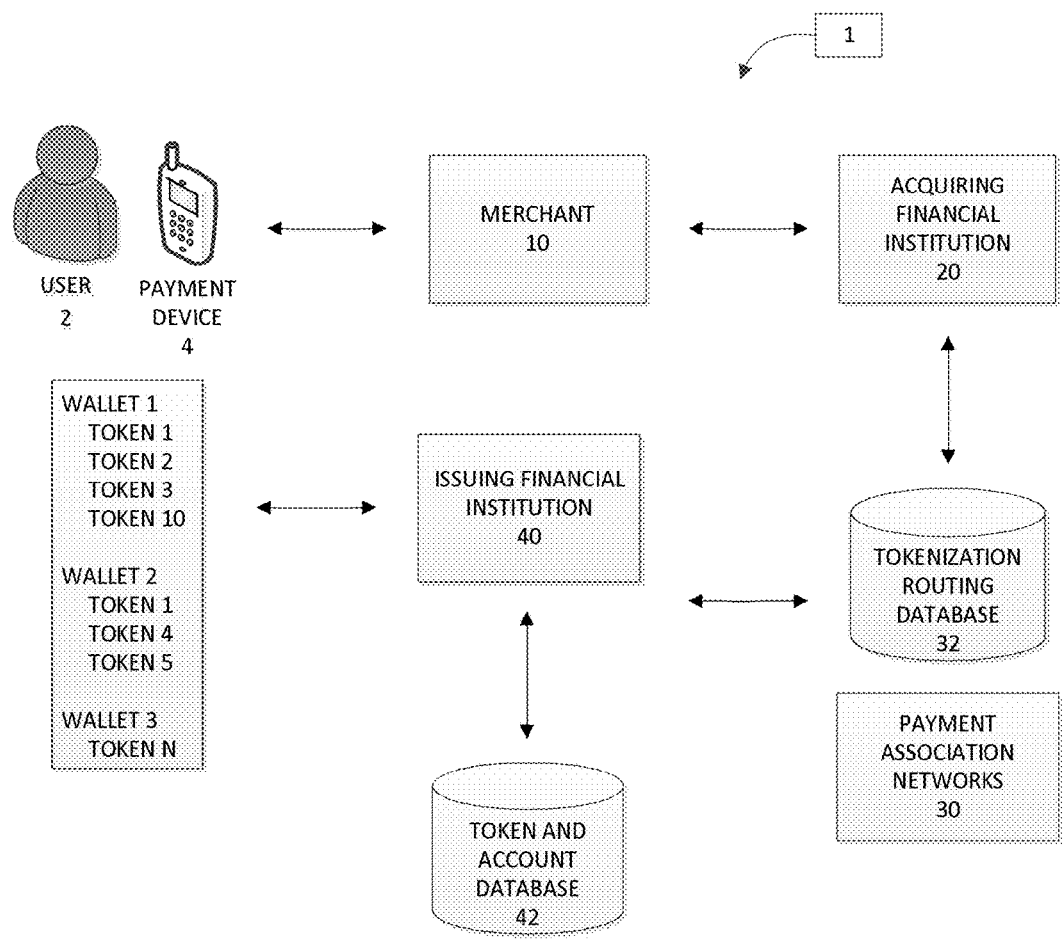
Figure 3:
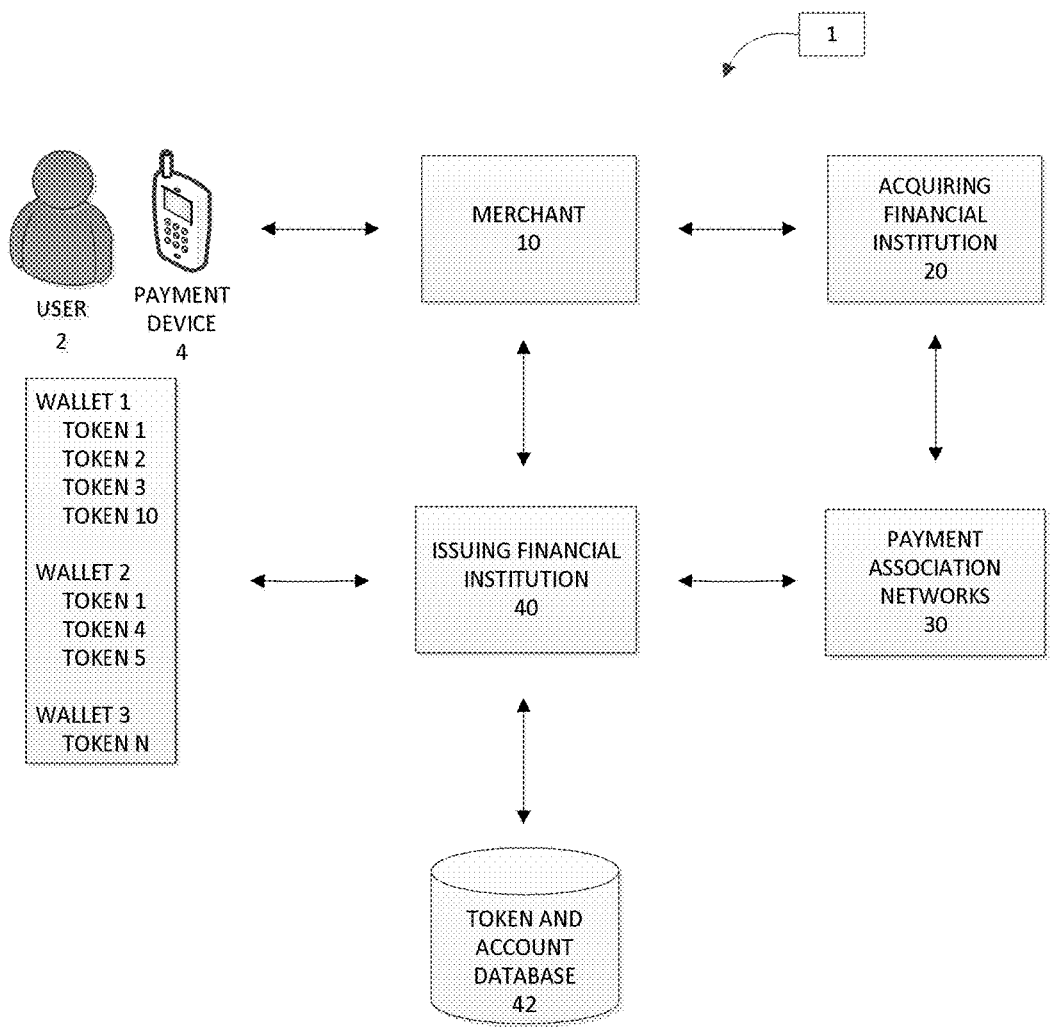
Figure 4:
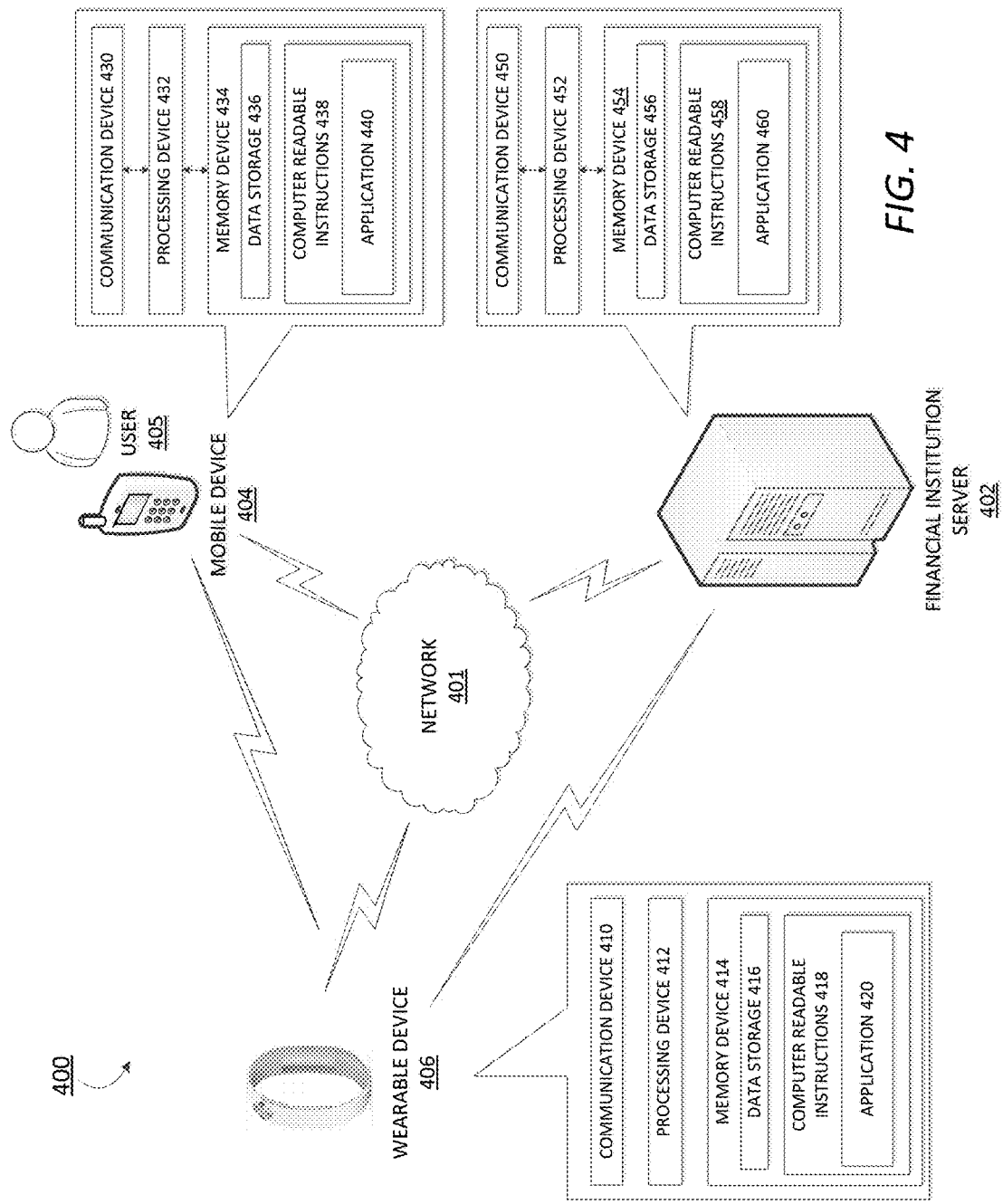
Figure 5:
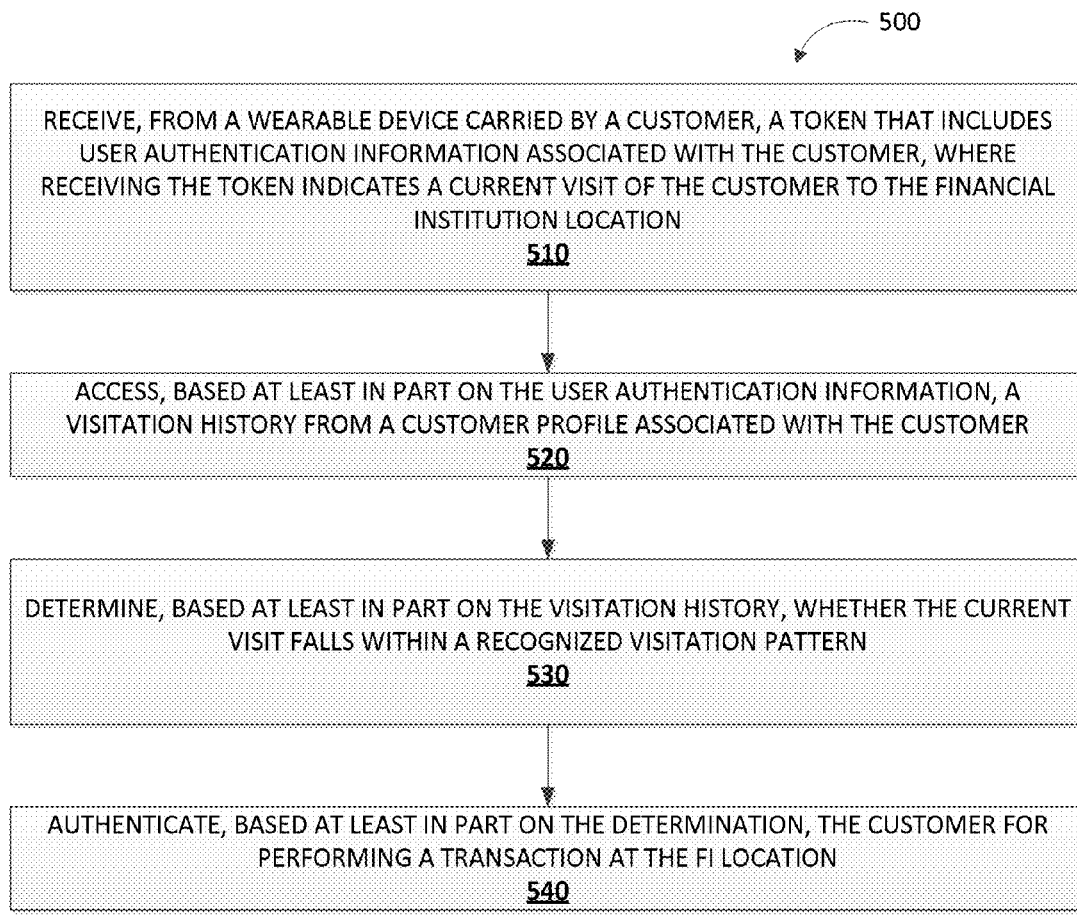
Figure 6:
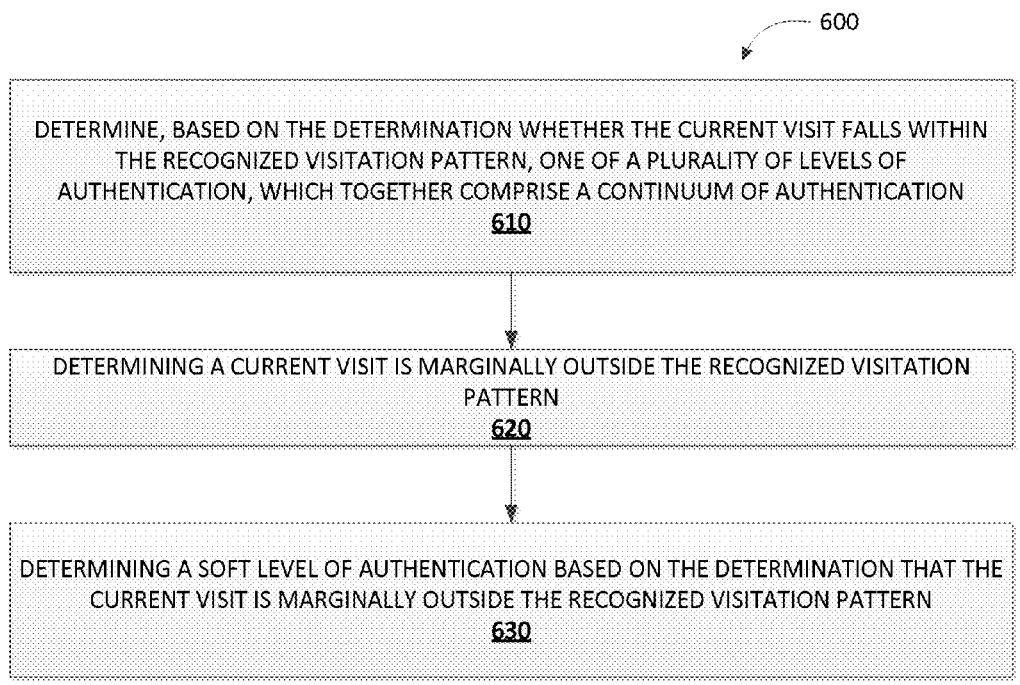
Figure 7:
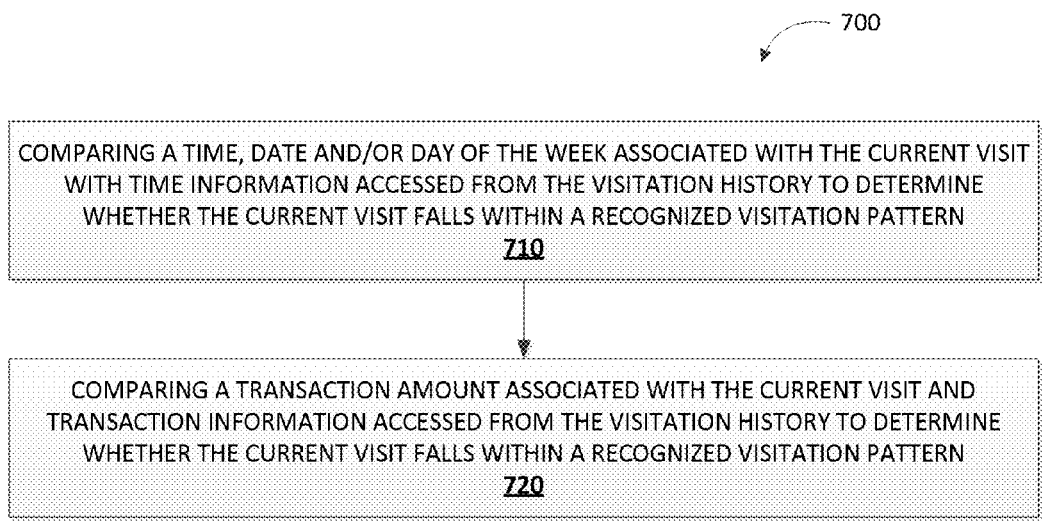
Figure 8A:
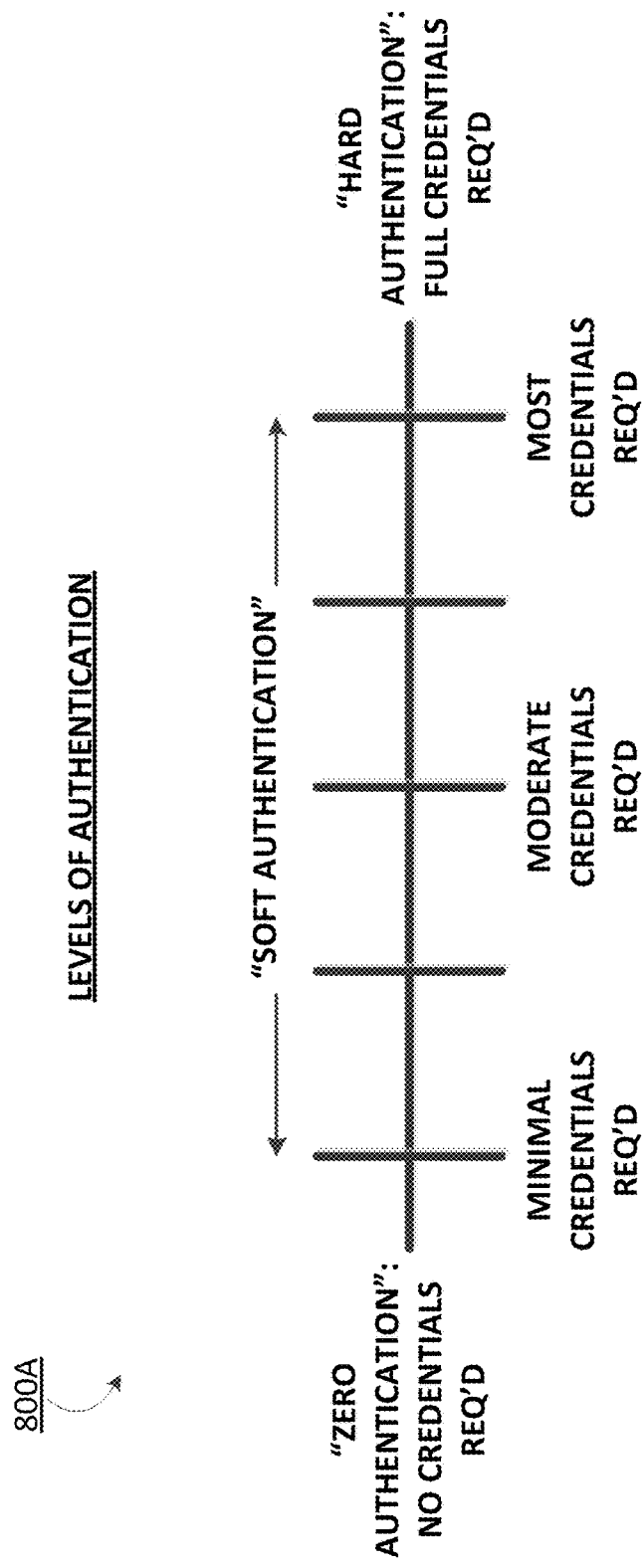
Figure 8B:
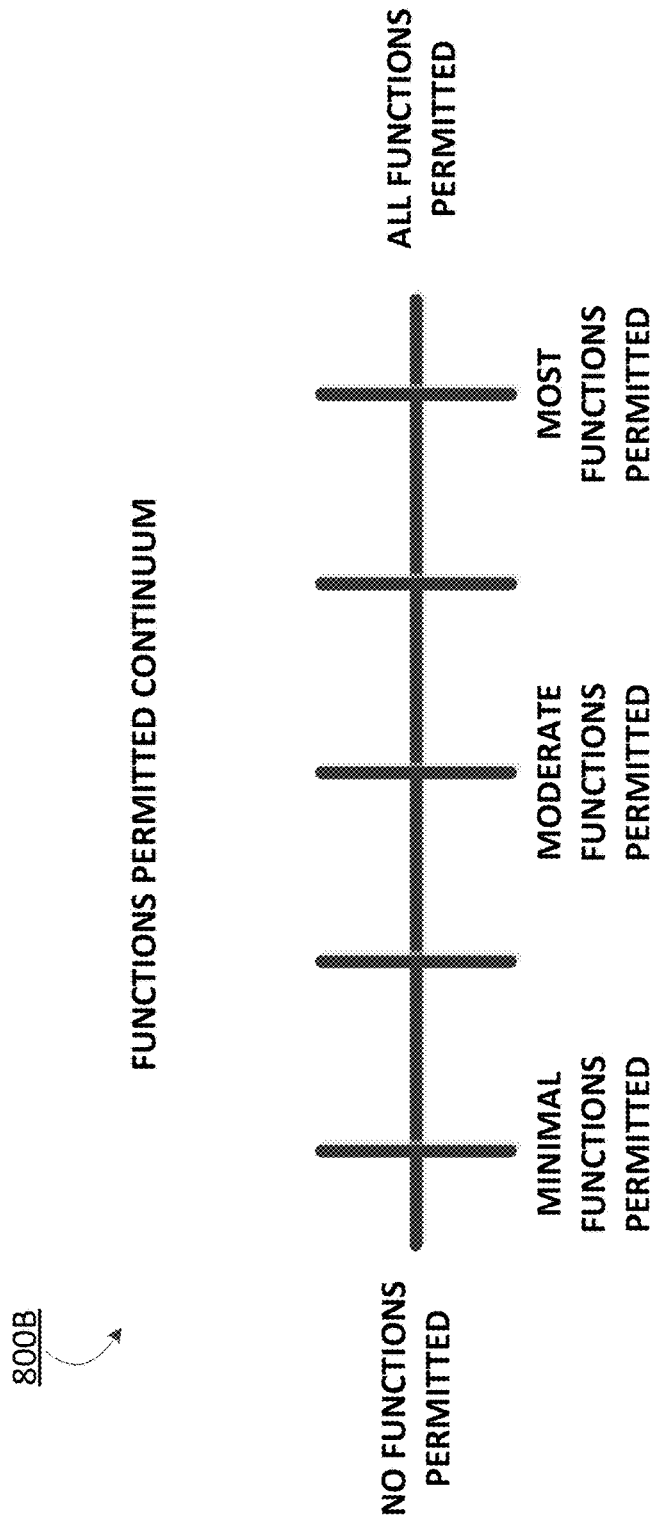
Figure 8C:
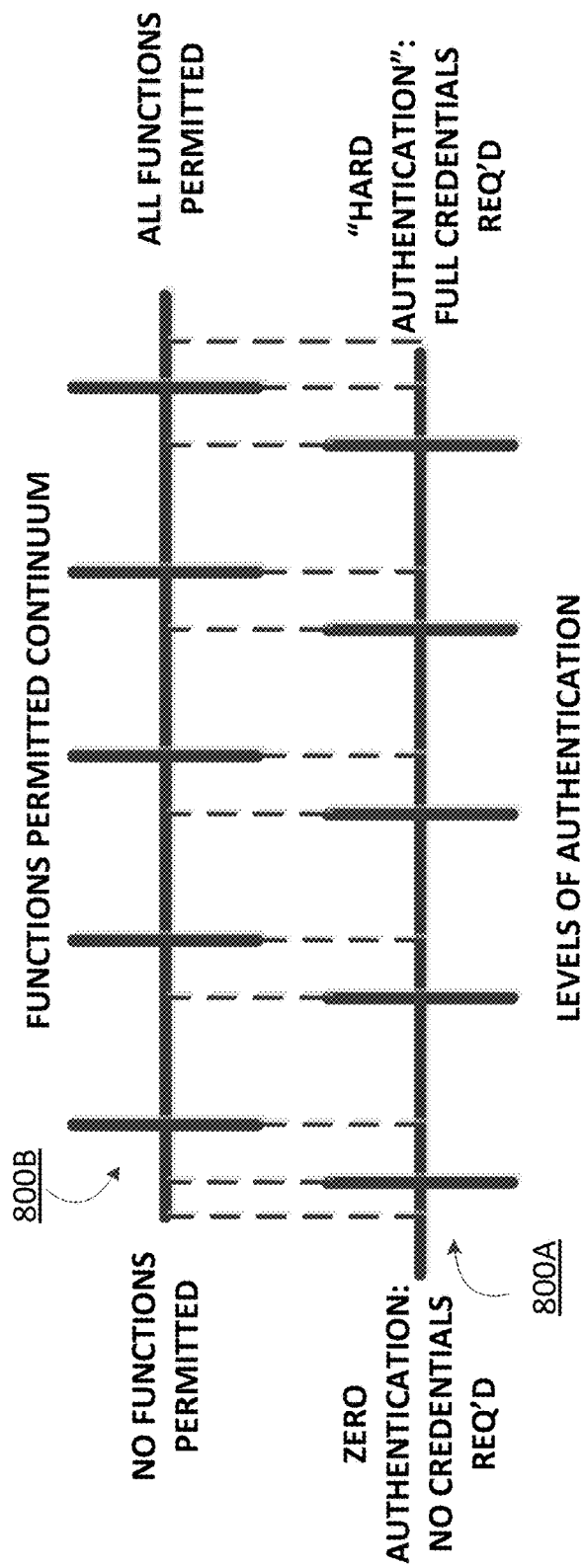

Having thus described embodiments of the invention in general terms, reference will now be made to the accompanying drawings, where:

FIG. 1 is a diagram illustrating a token system, in accordance with embodiments of the present invention;

FIG. 2 is a diagram illustrating a token system, in accordance with embodiments of the present invention;

FIG. 3 is a diagram illustrating a token system, in accordance with embodiments of the present invention;

FIG. 4 is a diagram illustrating an environment in which systems according to embodiments of the invention operate;

FIG. 5 is a flowchart illustrating a method for receiving a token from a wearable device carried by a customer, the token for user authentication based on a visitation pattern of the customer according to embodiments of the invention;

FIG. 6 is a flowchart illustrating a method for receiving a token from a wearable device carried by a customer, the token for user authentication based on a visitation pattern of the customer according to embodiments of the invention;

FIG. 7 is a flowchart illustrating a method for receiving a token from a wearable device carried by a customer, the token for user authentication based on a visitation pattern of the customer according to embodiments of the invention;

FIG. 8A provides a diagram illustrating an authentication continuum, in accordance with an embodiment of the present invention;

FIG. 8B provides a diagram illustrating an application functions permitted continuum, in accordance with an embodiment of the present invention; and FIG. 8C provides a diagram illustrating multiple continuums, in accordance with an embodiment of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In accordance with embodiments of the invention, the term "financial transaction" or "transaction" refers to any transaction involving directly or indirectly the movement of monetary funds through traditional paper transaction processing systems (i.e. paper check processing) or through electronic transaction processing systems. Typical financial transactions include point of sale (POS) transactions, automated teller machine (ATM) transactions, internet transactions, electronic funds transfers (EFT) between accounts, transactions with a financial institution teller, personal checks, etc. When discussing that transactions are evaluated it could mean that the transaction has already occurred, is in the processing of occurring or being processed, or it has yet to be processed by one or more financial institutions. In some embodiments of the invention the transaction may be a customer account event, such as but not limited to the customer changing a password, ordering new checks, adding new accounts, opening new accounts, etc.

In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

In accordance with embodiments of the invention the terms "customer" and "user" and "consumer" may be interchangeable. These terms may relate to a direct customer of the financial institution or person or entity that has authorization to act on behalf of the direct customer, user, or consumer (i.e., indirect customer).

Various embodiments of the present invention relate to tokenization, which is generally described in the area of financial transactions as utilizing a "token" (e.g., an alias, substitute, surrogate, or other like identifier) as a replacement for sensitive account information, and in particular account numbers. As such, tokens or portions of tokens may be used as a stand in for a user account number, user name, pin number, routing information related to the financial institution associated with the account, security code, or other like information relating to the user account. The one or more tokens may then be utilized as a payment instrument to complete a transaction. The one or more tokens may be associated with one or more payment devices directly or within one or more digital wallets associated with the payment devices. In other embodiments, the tokens may be associated with electronic transactions that are made over the Internet instead of using a physical payment device. Utilizing a token as a payment instrument instead of actual account information, and specifically an account number, improves security, and provides flexibility and convenience in controlling the transactions, controlling accounts used for the transactions, and sharing transactions between various users.

Tokens may be single-use instruments or multi-use instruments depending on the types of controls (e.g., limits) initiated for the token, and the transactions in which the token is used as a payment instrument. Single-use tokens may be utilized once, and thereafter disappear, are replaced, or are erased, while multi-use tokens may be utilized more than once before they disappear, are replaced, or are erased.

Tokens may be 16-digit numbers (e.g., like credit, debit, or other like account numbers), may be numbers that are less than 16-digits, or may contain a combination of numbers, symbols, letters, or the like, and be more than, less than, or equal to 16-characters. In some embodiments, the tokens may have to be 16-characters or less in order to be compatible with the standard processing systems between merchants, acquiring financial institutions (e.g., merchant financial institution), card association networks (e.g., card processing companies), issuing financial institutions (e.g., user financial institution), or the like, which are used to request authorization, and approve or deny transactions entered into between a merchant (e.g., a specific business or individual user) and a user. In other embodiments of the invention, the tokens may be other types of electronic information (e.g., pictures, codes, or the like) that could be used to enter into a transaction instead of, or in addition to, using a string of characters (e.g., numbered character strings, alphanumeric character strings, symbolic character strings, combinations thereof, or the like).

A user may have one or more digital wallets on the user's payment device. The digital wallets may be associated specifically with the user's financial institution, or in other embodiments may be associated with a specific merchant, group of merchants, or other third parties. The user may associate one or more user accounts (e.g., from the same institution or from multiple institutions) with the one or more digital wallets. In some embodiments, instead of the digital wallet storing the specific account number associated with the user account, the digital wallet may store a token or allow access to a token (e.g., provide a link or information that directs a system to a location of a token), in order to represent the specific account number during a transaction. In other embodiments of the invention, the digital wallet may store some or all of the user account information (e.g., account number, user name, pin number, or the like), including the user account number, but presents the one or more tokens instead of the user account information when entering into a transaction with a merchant. The merchant may be a business, a person that is selling a good or service (hereinafter "product"), or any other institution or individual with which the user is entering into a transaction.

The digital wallet may be utilized in a number of different ways. For example, the digital wallet may be a device digital wallet, a cloud digital wallet, an e-commerce digital wallet, or another type of digital wallet. In the case of a device digital wallet the tokens are actually stored on the payment device. When the device digital wallet is used in a transaction the token stored on the device is used to enter into the transaction with the merchant. With respect to a cloud digital wallet the device does not store the token, but instead the token is stored in the cloud of the provider of the digital wallet (or another third party). When the user enters into a transaction with a merchant, transaction information is collected and provided to the owner of the cloud to determine the token, and thus, how the transaction should be processed. In the case of an e-commerce digital wallet, a transaction is entered into over the Internet and not through a point of sale terminal. As was the case with the cloud digital wallet, when entering into a transaction with the merchant over the Internet the transaction information may be captured and transferred to the wallet provider (e.g., in some embodiments this may be the merchant or another third party that stores the token), and the transaction may be processed accordingly.

Specific tokens, in some embodiments, may be tied to a single user account, but in other embodiments, may be tied to multiple user accounts, as will be described throughout this application. In some embodiments a single tokens could represent multiple accounts, such that when entering into a transaction the user may select the token (or digital wallet associated with the token) and select one of the one or more accounts associated with the token in order to allocate the transaction to a specific account. In still other embodiments, after selection of the token by the user the system may determine the best account associated with the token to use during the transaction (e.g., most cash back, most rewards points, best discount, or the like). In addition, the tokens may be associated with a specific digital wallet or multiple digital wallets as desired by the institutions or users.

Moreover, the tokens themselves, or the user accounts, individual users, digital wallets, or the like associated with the tokens, may have limitations that limit the transactions that the users may enter into using the tokens. The limitations may include, limiting the transactions of the user to a single merchant, a group of multiple merchants, merchant categories, single products, a group a products, product categories, transaction amounts, transaction numbers, geographic locations, or other like limits as is described herein.

FIGS. 1 through 3 illustrate a number of different ways that the user 2 may use one or more tokens in order to enter into a transaction, as well as how the parties associated with the transaction may process the transaction. FIG. 1, illustrates one embodiment of a token system process 1, wherein the token system process 1 is used in association with a tokenization service 50. The tokenization service 50 may be provided by a third-party institution, the user's financial institution, or another institution involved in a transaction payment process. As illustrated in FIG. 1 (as well as in FIGS. 2 and 3), a user 2 may utilize a payment device 4 (or in other embodiments a payment instrument over the Internet) to enter into a transaction. FIG. 1 illustrates the payment device 4 as a mobile device, such as a smartphone, personal digital assistant, or other like mobile payment device. Other types of payment devices 4 may be used to make payments, such as but not limited to an electronic payment card, key fob, a wearable payment device (e.g., watch, glasses, or the like), or other like payment devices 4. As such, when using a payment device 4 the transaction may be made between the point of sale (POS) and the payment device 4 by scanning information from the payment device 4, using near field communication (NFC) between the POS and the payment device 4, using wireless communication between the POS and the payment device 4, or using another other type of communication between the POS and the payment device 4. When entering into an e-commerce transaction over the Internet, for example using the payment device 4 or another device without a POS, a payment instrument (e.g., a payment application that stores the token) may be used to enter into the transaction. The payment instrument may be the same as the token or digital wallet associated with the payment device 4, except they are not associated with specific payment device. For example, the token or digital wallet may be associated with a payment application that can be used regardless the device being used to enter into the transaction over the Internet.

The token can be associated directly with the payment device 4, or otherwise, through one or more digital wallets associated with the payment device 4. For example, the token may be stored on one or more payment devices 4 directly, and as such any transaction entered into by the user 2 with the one or more payment devices 4 may utilize the token. Alternatively, the payment device 4 may have one or more digital wallets stored on the payment device 4 that allow the user 2 to store one or more user account numbers, or tokens associated with the user account numbers, on the one or more digital wallets. The user may select a digital wallet or account within the digital wallet in order to enter into a transaction using a specific type of customer account. As such, the digital wallets may be associated with the user's issuing financial institutions 40, other financial institutions, merchants 10 with which the user enters into transactions, or a third party institutions that facilitates transactions between users 2 and merchants 10.

As illustrated in FIG. 1, a tokenization service 50 may be available for the user 2 to use during transactions. As such, before entering into a transaction, the user 2 may generate (e.g., create, request, or the like) a token in order to make a payment using the tokenization service 50, and in response the tokenization service 50 provides a token to the user and stores an association between the token and the user account number in a secure token and account database 52. The token may be stored in the user's payment device 4 (e.g., on the digital wallet) or stored on the cloud or other service through the tokenization service 50. The tokenization service 50 may also store limits (e.g., geographic limits, transaction amount limits, merchant limits, product limits, any other limit described herein, or the like) associated with the token that may limit the transactions in which the user 2 may enter. The limits may be placed on the token by the user 2, or another entity (e.g., client, administrator, person, company, or the like) responsible for the transactions entered into by the user 2 using the account associated with the token. The generation of the token may occur at the time of the transaction or well in advance of the transaction, as a one-time use token or multi-use token.

After or during creation of the token the user 2 enters into a transaction with a merchant 10 using the payment device 4 (or payment instrument over the Internet). In some embodiments the user 2 may use the payment device 4 by itself, or specifically select a digital wallet or user account stored within the digital wallet, to use in order to enter into the transaction. The token associated with payment device, digital wallet, or user account within the wallet is presented to the merchant 10 as payment in lieu of the actual user account number and/or other user account information. The merchant 10 receives the token, multiple tokens, and/or additional user account information for the transaction. The merchant 10 may or may not know that the token being presented for the transaction is a substitute for a user account number or other user account information. The merchant also captures transaction information (e.g., merchant, merchant location, transaction amount, product, or the like) related to the transaction in which the user 2 is entering with the merchant 10.

The merchant 10 submits the token (as well as any user account information not substituted by a token) and the transaction information for authorization along the normal processing channels (also described as processing rails), which are normally used to process a transaction made by the user 2 using a user account number. In one embodiment of the invention the acquiring financial institution 20, or any other institution used to process transactions from the merchant 10, receives the token, user account information, and transaction information from the merchant 10. The acquiring financial institution 20 identifies the token as being associated with a particular tokenization service 50 through the token itself or user account information associated with the token. For example, the identification of the tokenization service 50 may be made through a sub-set of characters associated with the token, a routing number associated with the token, other information associated with the token (e.g., tokenization service name), or the like. The acquiring financial institution 20 may communicate with the tokenization service 50 in order to determine the user account number associated with the token. The tokenization service 50 may receive the token and transaction data from the acquiring financial institution 20, and in response, provide the acquiring financial institution 20 the user account number associated with the token as well as other user information that may be needed to complete the transaction (e.g., user name, issuing financial institution routing number, user account number security codes, pin number, or the like). In other embodiments, if limits have been placed on the token, the tokenization service 50 may determine whether or not the transaction information meets the limits and either allows or denies the transaction (e.g., provides the user account number or fails to provide the user account number). The embodiment being described occurs when the token is actually stored on the payment device 4. In other embodiments, for example, when the actual token is stored in a cloud the payment device 4 may only store a link to the token or other token information that allows the merchant 10 or acquiring financial institution to acquire the token from a stored cloud location.

If the acquiring financial institution 20 receives the user account number from the tokenization service 50 (e.g., the tokenization service indicates that the transaction meets the limits), then the acquiring financial institution 20 thereafter sends the user account number, the other user information, and the transaction information directly to the issuing financial institution 40, or otherwise indirectly through the card association networks 30. The issuing financial institution 40 determines if the user 2 has the funds available to enter into the transaction, and if the transaction meets other limits on the user account, and responds with approval or denial of the transaction. The approval runs back through the processing channels until the acquiring financial institution 20 provides approval or denial of the transaction to the merchant 10 and the transaction between the merchant 10 and the user 2 is completed. After the transaction is completed the token may be deleted, erased, or the like if it is a single-use token, or stored for further use if it is a multi-use token.

Instead of the process described above, in which the acquiring financial institution 20 requests the token from the tokenization service 50, in some embodiments the tokenization service 50 may receive the transaction request and transaction information from the merchant 10 or acquiring financial institution 20. Instead of providing the account number to the acquiring financial institution 20, the tokenization service 50 may send the transaction request and transaction information to the issuing financial institution 40 directly, or indirectly through the payment association networks 30.

The embodiment illustrated in FIG. 1 prevents the user account number and other user information from being presented to the merchant 10; however, the tokenization service 50, acquiring financial institution 20, the card association networks 30, and the issuing financial institution 40 may all utilize the actual user account number and other user information to complete the transaction.

FIG. 2 illustrates another embodiment of a token system process 1, in which the user 2 may utilize a payment device 4 (or payment instrument over the Internet) to enter into transactions with merchants 10 utilizing tokens instead of user account numbers. As illustrated in FIG. 2, the user may have one or more tokens, which may be associated with the payment device 4, one or more digital wallets within the payment device 4, or one or more user accounts associated with the digital wallets. The one or more tokens may be stored in the user's payment device 4 (or on the digital wallet), or stored on a cloud or other service through the issuing financial institution 40 or another institution. The user 2 may set up the digital wallet by communicating with the issuing financial institution 40 (e.g., the user's financial institution) to request a token for the payment device, either for the device itself, or for one or more digital wallets or one or more user accounts stored on the payment device. As previously discussed, a wallet may be specifically associated with a particular merchant (e.g., received from the merchant 10) and include one or more tokens provided by the issuing financial institution 40 directly (or through the merchant as described with respect to FIG. 3). In other embodiments, the issuing financial institution 40 may create the digital wallet for the user 2 (e.g., through a wallet created for a business client or retail client associated with the user 2) and include one or more tokens for various types of transactions, products, or the like. The issuing financial institution 40 may store the tokens, the associated user account information (e.g., including the user account number), and any limits on the use of the tokens, as was previously described with respect to the tokenization service 50 in FIG. 1. In one embodiment the tokens may include user account information or routing information within the token or tied to the token, which allows the merchants 10 and other institutions in the payment processing systems to route the token and the transaction information to the proper institutions for processing. In other embodiments a tokenization routing database 32 may be utilized to determine where to route a transaction using a token, as described in further detail later.

The user 2 may enter into a transaction with the merchant 10 using a payment device 4 (or a payment instrument through the Internet). In one embodiment the user 2 may enter into the transaction with a token associated with the payment device 4 itself (or a payment instrument through the Internet). In other embodiments, a specific digital wallet and/or a specific account within the digital wallet may be selected for a particular merchant with whom the user 2 wants to enter into a transaction. For example, the user 2 may select "wallet 1" to enter into a transaction with "merchant 1" and "token 1" to utilize a specific account. The merchant 10 identifies the token, and sends the token and the transaction information to the acquiring financial institution 20. If the token has routing information the acquiring financial institution 20 may route the token and transaction data to the issuing financial institution 40 directly or through the card association networks 30. In situations where the token does not have associated routing information, the acquiring financial institution 20 may utilize a tokenization routing database 32 that stores tokens or groups of tokens and indicates to which issuing financial institutions 40 the tokens should be routed. One or more of the acquiring financial institutions 20, the card association networks 30, and/or the issuing financial institutions 40 may control the tokenization routing database in order to assign and manage routing instructions for tokenization across the payment processing industry. The tokenization routing database 32 may be populated with the tokens and the corresponding issuing financial institutions 40 to which transactions associated with the tokens should be routed. However, in some embodiments no customer account information would be stored in this tokenization routing database 32, only the instructions for routing particular tokens may be stored.

Once the token and transaction details are routed to the issuing financial institution 40, the issuing financial institution 20 determines the user account associated with the token through the use of the token account database 42. The financial institution determines if the funds are available in the user account for the transaction and if the transaction information meets other limits by comparing the transaction information with the limits associated with the token, the user account associated with the token, or other limits described herein. If the transaction meets the limits associated with the token or user account, then the issuing financial institution 20 allows the transaction. If the transaction information does not meet one or more of the limits, then the issuing financial institution 20 denies the transaction. The issuing financial institution sends a notification of the approval or denial of the transaction back along the channels of the transaction processing system to the merchant 10, which either allows or denies the transaction.

The embodiment illustrated in FIG. 2 allows the user and the financial institution to shield the user's account number and other user information from all of the entities in the payment processing system because the merchant 10, acquiring merchant bank 20, payment association networks 30, or other institutions in the payment processing system only use the token and/or other shielded user information to process the transaction. Only the issuing financial institution 40 has the actual account number of the user 2.

FIG. 3 illustrates another embodiment of the token system process 1, in which the user 2 may utilize a payment device 4 (or payment instrument over the Internet) to enter into transactions with a merchant 10 utilizing a token instead of a user account number and/or other user account information. As illustrated in FIG. 3, the user 2 may have one or more tokens associated with the payment device 2, the one or more digital wallets, or one or more user accounts within the digital wallets. The one or more tokens may be stored in the user's payment device 4 (or within the digital wallet), or stored on a cloud or other service through the issuing financial institution 40 or another institution. The user 2 may set up the digital wallet by communicating with the issuing financial institution 40 (e.g., the user's financial institution) and/or the merchant 10 to request a token for the payment device 4, either for the payment device 4 itself, for the one or more digital wallets stored on the payment device 4, or for user accounts within the digital wallet. The financial institution 40 may have a dedicated group of tokens that are associated with a specific merchant, and as such the merchant 10 and the issuing financial institution 40 may communicate with each other to provide one or more tokens to the user 2 that may be specifically associated with the merchant 10. For example, the issuing financial institution may provide a set of tokens to "merchant 1" to associate with "wallet 1" that may be used by one or more users 2. As such "Token 10" may be associated with "wallet 1" and be specified only for use for transactions with "merchant 1."

The merchant 10 may provide the specific tokens from the financial institution 40 to the user 2, while the financial institution 40 may store the user account information with the token provided to the user 2. The financial institution may communicate directly with the user 2, or through the merchant 10 in some embodiments, in order to associate the token with the user 2. Since the merchant 10 provides, or is at least notified by the financial institution 40, that a specific token, or groups of tokens, are associated with a specific issuing financial institution 40, then the merchant 10 may associate routing information and transaction information with the token when the user 2 enters into a transaction with the merchant 10 using the token.

The merchant 10 passes the token (and potentially other user account information), routing information, and transaction information to the acquiring financial institution 20 using the traditional payment processing channels. The acquiring financial institution 20, in turn, passes the token (and potentially other user account information) and transaction information to the issuing financial institution 40 directly, or indirectly through the payment association networks 30 using the routing information. The issuing financial institution 40 accesses the token and account database 42 to identify the user account associated with the token and determines if the transaction information violates any limits associated with the token or the user account. The issuing financial institution 40 then either approves or denies the transaction and sends the approval or denial notification back through the payment processing system channels to the merchant 10, which then notifies the user 2 that the transaction is allowed or denied.

As is the case with the token system process 1 in FIG. 2, the token system process 1 in FIG. 3 allows the user 2 and the financial institution 40 to shield the user's account number and other user information from all of the entities in the payment processing system because the merchant 10, acquiring merchant bank 20, payment association networks 30, or other institutions in the payment processing system only use the token and/or other shielded user information to process the transaction. Only the issuing financial institution 40 has the actual account number of the user 2.

The embodiments of the invention illustrated in FIGS. 1 through 3 are only example embodiments of the invention, and as such it should be understood that combinations of these embodiments, or other embodiments not specifically described herein may be utilized in order to process transactions between a user 2 and merchant 10 using one or more tokens as a substitute for user account numbers or other user account information, such that the merchant 10, or other institutions in the payment processing system do not have access to the actual user accounts or account information.

As briefly discussed above, if the issuing financial institution 40 creates the digital wallet not only does the issuing financial institution 40 receive transaction information along the normal processing channels, but the financial institution 50 may also receive additional transaction information from the user 2 through the digital wallet using the application program interfaces (APIs) or other applications created for the digital wallet. For example, geographic location information of the user 2, dates and times, product information, merchant information, or any other information may be transmitted to the issuing financial institution 40 through the APIs or other applications to the extent that this information is not already provided through the normal transaction processing channels. This additional transaction information may assist in determining if the transactions meet or violate limits associated with the tokens, user accounts, digital wallets, or the like.

Alternatively, if the merchant 10 or another institution, other than the issuing financial institution 40, provides the digital wallet to the user 2, the issuing financial institution 40 may not receive all the transaction information from the traditional transaction processing channels or from the digital wallet. As such, the issuing financial institution 40 may have to receive additional transaction information from another application associated with the user 2 and compare the transaction information received through the traditional channels in order to associate the additional information with the transaction. In other embodiments, the issuing financial institutions 40 may have partnerships with the merchants 10 or other institutions to receive additional transaction information from the digital wallets provided by the merchants or other institutions when the users 2 enter into transactions using the digital wallets.

Moreover, when there is communication between the digital wallets of the users 2 and the issuing financial institution 40 or another institution, transactions in which the user 2 may enter may be pre-authorized (e.g., pre-qualified) to determine what accounts (e.g., tokens) may be used to complete the transaction, without having to arbitrarily choose an account for the transaction. In the case when there are multiple digital wallets or multiple accounts, the account that is pre-authorized or the account that provides the best rewards may be automatically chosen to complete the transactions.

Additional embodiments of the invention will now be described in further detail in order to provide additional concepts and examples related to how tokens may be utilized in these illustrated token system processes 1 or in other token system processes not specifically described in FIGS. 1 through 3.

Embodiments are directed to receiving a token from a wearable device carried by a customer, the token for user authentication based on a visitation pattern of the customer. Embodiments include receive, from the wearable device carried by the customer, the token comprising user authentication information associated with the customer, wherein receiving the token indicates a current visit of the customer to the financial institution location; access, based at least in part on the user authentication information, a visitation history from a customer profile associated with the customer; determine, based at least in part on the visitation history, whether the current visit falls within a recognized visitation pattern; and authenticate, based at least in part on the determination, the customer for performing a transaction at the financial institution location.

Referring to FIG. 4, a network environment is illustrated in accordance with embodiments of the present invention. As illustrated in FIG. 4, the financial institution (FI) server 402 is operatively coupled via a network 401 to the mobile device 404 and/or a wearable device 406. In this configuration, the FI server 402 may send information to and receive information from the mobile device 404 and/or the wearable device 406. Additionally, the mobile device 404 may send and receive communications directly from the wearable device 406. The FI server 402 may be or include one or more network base stations or other network components. FIG. 4 illustrates only one example of an embodiment of a network environment 400, and it will be appreciated that in other embodiments one or more of the systems, devices, or servers may be combined into a single system, device, or server, or be made up of multiple systems, devices, or server.

The network 401 may be a global area network (GAN), such as the Internet, a wide area network (WAN), a local area network (LAN), a telecommunication network or any other type of network or combination of networks. The network 401 may provide for wireline, wireless, or a combination wireline and wireless communication between devices on the network 401.

In some embodiments, the user 405 is an individual who maintains cellular products with one or more providers.

As illustrated in FIG. 4, the FI server 402 generally comprises a communication device 450, a processing device 452, and a memory device 454. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combination of the foregoing. Control and signal processing functions of the system are allocated between these processing devices according to their respective capabilities. The processing device may include functionality to operate one or more software programs based on computer readable instructions thereof, which may be stored in a memory device.

The processing device 452 is operatively coupled to the communication device 450 to communicate with the network 401 and other devices on the network 401. As such, the communication device 450 generally comprises a modem, server, or other device for communicating with other devices on the network 401.

As further illustrated in FIG. 4, the FI server 402 comprises computer readable instructions 458 of an application 460. In some embodiments, the memory device, 454 includes data storage 456 for storing data related to and/or used by the application 460. The application 460 may perform one or more of the steps and/or sub-steps discussed herein and/or one or more steps not discussed herein. For example, in some embodiments, the application 460 may receive a token from wearable device 406 and perform one or more steps based on receiving the token.

As illustrated in FIG. 4, the mobile device 404 generally comprises a communication device 430, a processing device 432, and a memory device 434. The processing device 432 is operatively coupled to the communication device 430 and the memory device 434. In some embodiments, the processing device 432 may send or receive data from the mobile device 404, to the remote server 402 via the communication device 430 over a network 401. As such, the communication device 430 generally comprises a modem, server, or other device for communicating with other devices on the network 401.

As further illustrated in FIG. 4, the mobile device 404 comprises computer readable instructions 438 stored in the memory device 434, which in one embodiments includes the computer-readable instructions 438 of an application 440. In the embodiment illustrated in FIG. 4, the application 440 allows the mobile device 404 to be linked to the remote server 402 to communicate, via a network 401. The application 440 may also allow the mobile device to connect directly (i.e. locally or device to device) with the wearable device 406 for performing a transaction such as managing the token(s) stored on the wearable device 406. The application 440 may perform one or more of the steps and/or sub-steps discussed herein and/or one or more steps not discussed herein.

As illustrated in FIG. 4, the wearable device 406 may include a communication device 410, a processing device 412, and a memory device 414. The processing device 412 is operatively coupled to the communication device 410 and the memory device 414. In some embodiments, the processing device 412 may send or receive data from the mobile device 404 and/or the FI server 402 via the communication device 410. Such communication may be performed either over a direct connection and/or over a network 401. As such, the communication device 410 generally comprises a modem, server, or other device for communication with other devices on the network 401.

As further illustrated in FIG. 4, the wearable device 406, may comprise computer-readable instructions 418 of an application 420. In the embodiment illustrated in FIG. 4, the application 420 allows the wearable device 406 to be linked to the FI server 402 to communicate, via a network 401. The application 420 may also allow the mobile device 406 to connect directly (i.e., locally or device to device) with the wearable device 406 or indirectly through the network 401. The application 420 may perform one or more of the steps and/or sub-steps discussed herein and/or one or more steps not discussed herein such as communicating one or more tokens to the FI server 402 or elsewhere.

In various embodiments, the mobile device 404 may be or include one or more wearable devices. Such a wearable device(s) (included in the mobile device) and/or wearable device 406 may be or include a wristband, watch, necklace, wristlet, anklet, earring, headband, ring, belt, device with a clip or other wearable device. The wearable device(s) may be or include one or more passive devices such as an RFID and/or may be or include one or more active electronic devices such as processors and/or communication device(s). In some embodiments, the wearable device(s) may include one or more biometric detection and/or processing device(s). Such biometric device(s) may detect one or more biometric characteristics of the user, process the characteristic(s) and confirm the identity of the customer. In some embodiments, the biometric device(s) send biometric information corresponding to the biometric characteristics of the user of the wearable device(s) to the FI server 402 and the FI server 402 then accesses stored biometric data corresponding to the customer to confirm the user's identity as the customer. In other cases, the wearable device(s) themselves confirm the identity of the user as the customer and simply communicates the identity of the customer and/or confirmation of the identity of the customer. In some cases, such biometric authentication (either performed by the wearable device or the FI server), may modify the level of authentication necessary for the customer to perform one or more transactions at the FI location. As discussed below with reference to FIGS. 8A, 8B and 8C, different levels of authentication may correspond to different levels of functionality, access and/or transaction abilities. For example, if the customer's identity is authenticated, then the customer may be granted access to account information without providing further identification.

It is understood that the servers, systems, and devices described herein illustrate one embodiment of the invention. It is further understood that one of more of the server, systems, and devices can be combined in other embodiments and still function in the same or similar way as the embodiments described herein.

In various embodiments, the FI server may be or include a merchant machine and/or server and/or may be or include the mobile device of the user may function as a point of transaction device. The embodiments described herein may refer to the use of a transaction, transaction event or point of transaction event to trigger the steps, functions, routines etc. described herein. In various embodiments, occurrence of a transaction triggers the sending of information such as alerts and the like. Unless specifically limited by the context, a "transaction", "transaction event" or "point of transaction event" refers to any communication between the user and the merchant, e.g. financial institution, or other entity monitoring the user's activities. In some embodiments, for example, a transaction may refer to a purchase of goods or services, a return of goods or services, a payment transaction, a credit transaction, or other interaction involving a user's bank account. As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a transaction may refer to one or more of a sale of goods and/or services, an account balance inquiry, a rewards transfer, an account money transfer, opening a bank application on a user's computer or mobile device, a user accessing their e-wallet or any other interaction involving the user and/or the user's device that is detectable by the financial institution. As further examples, a transaction may occur when an entity associated with the user is alerted via the transaction of the user's location. A transaction may occur when a user accesses a building, uses a rewards card, and/or performs an account balance query. A transaction may occur as a user's mobile device establishes a wireless connection, such as a Wi-Fi connection, with a point-of-sale terminal. In some embodiments, a transaction may include one or more of the following: purchasing, renting, selling, and/or leasing goods and/or services (e.g., groceries, stamps, tickets, DVDs, vending machine items, etc.); withdrawing cash; making payments to creditors (e.g., paying monthly bills; paying federal, state, and/or local taxes and/or bills; etc.); sending remittances; transferring balances from one account to another account; loading money onto stored value cards (SVCs) and/or prepaid cards; donating to charities; and/or the like.

In some embodiments, the transaction may refer to an event and/or action or group of actions facilitated or performed by a user's device, such as a user's mobile device. Such a device may be referred to herein as a "point-of-transaction device". A "point-of-transaction" could refer to any location, virtual location or otherwise proximate occurrence of a transaction. A "point-of-transaction device" may refer to any device used to perform a transaction, either from the user's perspective, the merchant's perspective or both. In some embodiments, the point-of-transaction device refers only to a user's device, in other embodiments it refers only to a merchant device, and in yet other embodiments, it refers to both a user device and a merchant device interacting to perform a transaction. For example, in one embodiment, the point-of-transaction device refers to the user's mobile device configured to communicate with a merchant's point of sale terminal, whereas in other embodiments, the point-of-transaction device refers to the merchant's point of sale terminal configured to communicate with a user's mobile device, and in yet other embodiments, the point-of-transaction device refers to both the user's mobile device and the merchant's point of sale terminal configured to communicate with each other to carry out a transaction.

As used herein, a "user device" or "mobile device" may be a point-of-transaction device as discussed, or may otherwise be a device carried by a user configured to communicate across a network such as a cellular network, wireless fidelity network or otherwise. As used here a "user" refers to a previous customer or a non-customer of one or more merchants or entities associated with one or more merchants.

In some embodiments, a point-of-transaction device is or includes an interactive computer terminal that is configured to initiate, perform, complete, and/or facilitate one or more transactions. A point-of-transaction device could be or include any device that a user may use to perform a transaction with an entity, such as, but not limited to, an ATM, a loyalty device such as a rewards card, loyalty card or other loyalty device, a magnetic-based payment device (e.g., a credit card, debit card, etc.), a personal identification number (PIN) payment device, a contactless payment device (e.g., a key fob), a radio frequency identification device (RFID) and the like, a computer, (e.g., a personal computer, tablet computer, desktop computer, server, laptop, etc.), a mobile device (e.g., a smartphone, cellular phone, personal digital assistant (PDA) device, MP3 device, personal GPS device, etc.), a merchant terminal, a self-service machine (e.g., vending machine, self-checkout machine, etc.), a public and/or business kiosk (e.g., an Internet kiosk, ticketing kiosk, bill pay kiosk, etc.), a gaming device, and/or various combinations of the foregoing.

In some embodiments, a point-of-transaction device is operated in a public place (e.g., on a street corner, at the doorstep of a private residence, in an open market, at a public rest stop, etc.). In other embodiments, the point-of-transaction device is additionally or alternatively operated in a place of business (e.g., in a retail store, post office, banking center, grocery store, factory floor, etc.). In accordance with some embodiments, the point-of-transaction device is not owned by the user of the point-of-transaction device. Rather, in some embodiments, the point-of-transaction device is owned by a mobile business operator or a point-of-transaction operator (e.g., merchant, vendor, salesperson, etc.). In yet other embodiments, the point-of-transaction device is owned by the financial institution offering the point-of-transaction device providing functionality in accordance with embodiments of the invention described herein.

Embodiments are directed to receiving a token from a wearable device carried by a customer, the token for user authentication based on a visitation pattern of the customer. Embodiments include receive, from the wearable device carried by the customer, the token comprising user authentication information associated with the customer, wherein receiving the token indicates a current visit of the customer to the financial institution location; access, based at least in part on the user authentication information, a visitation history from a customer profile associated with the customer; determine, based at least in part on the visitation history, whether the current visit falls within a recognized visitation pattern; and authenticate, based at least in part on the determination, the customer for performing a transaction at the financial institution location.

Referring now to FIG. 5, a flowchart illustrates a method 500 for receiving a token from a wearable device carried by a customer, the token for user authentication based on a visitation pattern of the customer according to embodiments of the invention. The first step, represented by block 510 is to receive, from a wearable device carried by a customer, a token that includes user authentication information (such as one or more credentials) associated with the customer. Receiving the token, in some embodiments, indicates to the FI server that a current visit of the customer to the FI location is taking place. The next step, represented by block 520, is to access, based at least in part on the user authentication information, a visitation history from a customer profile associated with the customer. The visitation history may be stored locally at the FI server or may be stored remotely in one or more databases and/or servers. Next, as represented by block 530, the FI server determines, based at least in part on the visitation history, whether the current visit falls within a recognized visitation pattern. Finally, as represented by block 540, the FI server authenticates, based at least in part on the determination, the customer for performing one or more transactions at the FI location where the customer is visiting.

Referring now to FIG. 6, a flowchart illustrates a method 600 for receiving a token from a wearable device carried by a customer, the token for user authentication based on a visitation pattern of the customer including one or more optional steps that may be performed in conjunction with one or more of the steps of method 500 and/or one or more other steps according to embodiments of the invention. The first step, represented by block 610, is to determine, based on the determination whether the current visit falls within the recognized visitation pattern, one of a plurality of levels of authentication, which together comprise a continuum of authentication. In some embodiments, no additional authentication is required, in some embodiments, soft authentication requiring at least one additional credential is required, and in some embodiments, hard authentication (or full authentication) requiring at least two or more additional credentials is required based on the determined level of authentication. The level of authentication may be based on how close the customer's visitation characteristics come to an established or regular visitation pattern. The characteristics that may be compared include time/date/day of week, transaction types and/or amount or others.

In some cases, determining that a current visit is marginally outside a recognized visitation pattern, as represented by block 620, results in a determination that a soft level of authentication is required as represented by block 630.

Referring now to FIG. 7, a flowchart illustrates a method 700 for receiving a token from a wearable device carried by a customer, the token for user authentication based on a visitation pattern of the customer including one or more optional steps that may be performed in conjunction with one or more of the steps of method 500, method 600 and/or one or more other steps according to embodiments of the invention. The first step, represented by block 710, is to compare a time, date and/or day of the week associated with the current visit with time information accessed from the visitation history to determine whether the current visit falls within a recognized visitation pattern. The next step, represented by block 720, is to compare a transaction amount associated with the current visit and transaction information accessed from the visitation history to determine whether the current visit falls within a recognized visitation pattern.

It will further be understood that a system as contemplated herein can be configured to perform any of the portions of the process flows 500, 600 and/or 700 upon or after one or more triggering events (which, in some embodiments, is one or more of the portions of the process flows 500, 600 and/or 700). As used herein, "triggering event" refers to an event that automatically triggers the execution, performance, and/or implementation of a triggered action, either immediately, nearly immediately, or sometime after (e.g., within minutes, etc.) the occurrence of the triggering event. For example, in some embodiments, the system performing any of the portions of the process flows 500, 600 and/or 700 is configured such that the system receiving an indication of a compromised payment vehicle or a potential exposure to loss (the triggering event) automatically and immediately or nearly immediately triggers the system to automatically (without human intervention) generate a token for facilitating or completing a pending purchase transaction (the triggered action).

Also it will be understood that, in some embodiments, a predetermined time and/or the passage of a predetermined per any of the portions of the process flows 500, 600 and/or 700. Of course, any of the embodiments described and/or contemplated herein can involve one or more triggering events, triggered actions, automatic actions, and/or human actions.

In addition, it will be understood that, in some embodiments, a system performing any of the portions of the process flows 500, 600 and/or 700 (and/or a user thereof) is configured to perform each portion of the process flows 500, 600 and/or 700 from start to finish, within moments, seconds, and/or minutes (e.g., within approximately 10-15 minutes, etc.). In some embodiments, any of the portions of the process flows 500, 600 and/or 700 are performed in real time, in substantially real time, and/or at one or more predetermined times. Further, it will be understood that the number, order, and/or content of any of the portions of the process flows 500, 600 and/or 700 are exemplary and may vary. It will further be understood that the any of the portions of the process flows 500, 600 and/or 700 can be configured to perform any one or more of the portions of any one or more of the embodiments described and/or contemplated herein.

User authentication may be required in a variety of situations such as when a customer enters a FI location and wishes to perform one or more transactions. If a customer is outside his/her normal or recognized pattern, then harder authentication may be required for a particular function. Thus, as discussed below with reference to FIG. 8C, the authentication continuum may be shifted with respect to the functions permitted continuum based on whether a user is within or outside a recognized pattern. Further, the continua may be shifted with respect to one another based on varying degrees or based on a weighted consideration of "how far" outside the user's actions fall from the recognized pattern.

As another example, a user may be required to authenticate identity for access to an application on a computer system or a mobile device or for access to a particular feature, function or action of an application. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

Accordingly, a continuum of authentication may be used to quantify (or dictate) the levels of authentication. Likewise, a continuum of functions permitted may be used to quantify (or dictate) the number or context in which functions are permitted.

Referring to FIG. 8A, a continuum of authentication 800A is illustrated according to embodiments of the invention. On the left-hand side of the continuum, a "zero authentication" requires no authentication credentials. On the right-hand side of the continuum, a "hard authentication" requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 8C, the continuum of authentication 800A may be coupled with an application functions permitted continuum 800B, first illustrated in FIG. 8B.

Referring to FIG. 8B, the functions permitted continuum 800B illustrates various levels of functions, access, and/or transactions permitted. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 800B corresponds with a certain amount and/or number of functions that are permitted and/or the context in which certain functions are permitted.

Referring now to FIG. 8C, a diagram 800C illustrates a coupling of the application functions permitted continuum 800B and the levels of authentication continuum 800A. As shown, the continua 800B and 800A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 800A provides that a particular function or functions may be permitted given that a specified level of authentication credentials are supplied, as indicated by the corresponding point on continuum 800A. For example, a financial institution and/or a user may arrange the continua 800B and 800A with respect to one another and may adjust the arrangement based on changing desires or goals.

In some embodiments, one or both the continua 800B and 800A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention.

In various embodiments of the invention, the user and/or customer must opt-in for the mobile device and/or wearable device to receive and/or use the token token. Such opting-in can be accomplished through the customer's online banking access, a mobile application, in person at a FI location and/or otherwise.

In various embodiments, once the token is communicated from the mobile device and/or wearable device to the FI server, the financial institution (FI) then "knows" the customer is present. This may be beneficial in several ways. For example, the FI may initiate service specific to the customer. In some cases, the customer may have pre-scheduled an event such as initiating creation of a money order. Once the FI recognizes the customer is present, the money order may be created and/or retrieved. As another example, the FI may contact a collocated specialist such as a small business advisor or other customer-specific advisor to come out to greet or meet with the customer regarding a specific issue. In this regard, once the FI location knows the customer is present, the first of a chain of events, queues, actions or the like may be initiated.

In various embodiments of the invention, transaction limits and/or thresholds may be used. For example, transaction limits may be used to determine whether a payment credential has been exposed and/or whether to approve or deny a transaction. If a transaction (e.g., transaction information) fails to meet a limit, the transaction may be denied. Alternatively, if a transaction (e.g., transaction information) meets a limit, then the transaction may be allowed.

In various embodiments, the FI server may queue customer(s) in order to determine why they are visiting the FI location.

While the system has been described as determining whether the transaction meets the limits and thereby determining whether an exposure has occurred, in some embodiments filters for determining exposure may also be responsive to transaction information. For example, exceptions to filters may allow a transaction even if a filter is not met. In an embodiment, the system evaluates the transaction information to determine: (1) does the transaction meet the limits; and (2) if the transaction does not meet the limits, does the transaction qualify for an exception to the limits. If the system determines that a positive response to either query, then transaction may be allowed.

In some embodiments, the exceptions are based at least in part upon the transaction information. For example, the system may determine that a transaction does not meet a category limit because doing so would cause the token to exceed the category limit for the time period. In this example, however, the system also determines that the token is near, e.g., within one week, within three days, within one day, or the like, the expiration date of the token or the current evaluation period for the token and that the token has remaining funds in a different category. Given the short period of time remaining for the expenses to be made, the system may determine that the transaction falls within an exception and allow the transaction. In another example, the system may determine that the user is outside of geographic limits defined by a route. The system, however, determines that the user has conducted a transaction at the merchant frequently in the past and therefore allows the transaction based on the previous number of transactions at the merchant. These examples use multiple types of transaction information, e.g., the date of the transaction, the location of the transaction, the category of the transaction, the amount of the transaction, and the like, to determine if the exceptions apply. In some embodiments, only a single piece of transaction information applies. For example, the system may always permit transactions that are associated with a specific category, for example, emergency expenses. The system may always permit transactions at emergency rooms, doctors' offices, and the like.

In some embodiments, the exceptions are determined by the system and/or the user. For example, the system may provide a list of exceptions based on the user's transaction history. If the user has a favorite coffee shop, the system may allow transactions at the coffee shop up to a certain amount even if the transaction would not meet a limit. The user or an administrator may provide exceptions based on location or other transaction information. For example, the user may input exceptions that allow transactions within a specific region, e.g., a city, that would not be allowed outside of the specific region. The exceptions may be changed at any time by the system or user.

The exceptions may be limited by frequency, amount, percentage of the limit, or the like. For example, a transaction may qualify for an exception but only up to a certain percentage of the funds remaining in a related category. For example, a transaction may qualify for an exception because the expense period for the token is almost expired and there are remaining funds in a first category. The system may permit a transaction in a second category up to some percentage (e.g., 50%) of the funds remaining in the first category.

The transaction-responsive limits are designed to provide flexibility to the system and better serve the user. The transaction-responsive limits may be tailored to the user or generic to the token and/or system. By providing for transaction-responsive limits, the system allows transactions that would otherwise be denied based on binary yes/no limits when the transaction information indicates the appropriateness of the transaction.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| U.S. patent application Ser. No. | Title | Filed On |
|---|---|---|
| 14/251,351 (now U.S. Pat. No. 9,424,575) | USER AUTHENTICATION BY OPERATING SYSTEM-LEVEL TOKEN | Concurrently Herewith |
| 14/251,094 (now U.S. Pat. No. 9,588,342) | CUSTOMER RECOGNITION THROUGH USE OF AN OPTICAL HEAD-MOUNTED DISPLAY IN A WEARABLE COMPUTING DEVICE | Concurrently Herewith |
| 14/250,972 (published as U.S. patent application Pub. No. 2015/0294322) | SECURITY MONITORING IMPLEMENTING CUSTOMER RECOGNITION VIA AN AUGMENTED REALITY DISPLAY | Concurrently Herewith |

What is claimed is:

1. An apparatus disposed proximate a financial institution location, the apparatus for receiving a token from a wearable device carried by a customer, the token for user authentication based on a visitation pattern of the customer, the apparatus comprising:

a memory;
a processor; and
a module stored in the memory, executable by the processor, and configured to:
receive, from the wearable device carried by the customer, the token comprising user authentication information associated with the customer, wherein receiving the token indicates a current visit of the customer to the financial institution location;
receive, from the wearable device carried by the customer, financial transaction limitation information indicating at least one limitation on transactions performed with the token;
access, based at least in part on the user authentication information, a visitation history from a customer profile associated with the customer;
determine, based at least in part on the visitation history, whether the current visit falls within a recognized visitation pattern;
if so, determine that a required level of authentication for the current visit is a soft level of authentication, wherein the soft level of authentication is one of a plurality of levels of authentication comprising a continuum of authentication; and
if not, determine that the required level of authentication for the current visit is a hard level of authentication, wherein the hard level of authentication is one of the plurality of levels of authentication comprising the continuum of authentication and wherein the hard level of authentication requires full authentication credentials;
receive a request to perform a financial transaction from the customer;
determine that the requested financial transaction exceeds the at least one limitation indicated by the financial transaction limitation information;
in response to determining that the requested financial transaction exceeds the at least one limitation, identify that the requested financial transaction qualifies for an exception to the at least one limitation indicated by the financial transaction limitation information based on at least one of:
identifying that a number of days between a current real-time date and an expiration date of the token is less than a predetermined limit; and
identifying that a category of the requested financial transaction is within a predetermined list of categories; and
in response to determining that the requested financial transaction qualifies for the exception, authenticate, based on the required level of authentication, the customer to initiate the financial transaction at the financial institution location.

2. The apparatus of claim 1, wherein the current visit falls within the recognized visitation pattern; and wherein determining that the current visit requires the soft level of authentication comprises determining a zero level of authentication wherein authentication requires no additional credentials.

3. The apparatus of claim 1, wherein the current visit falls within the recognized visitation pattern; wherein determining the soft level of authentication requires authentication that is less than a full level of authentication; and wherein the soft level of authentication requires at least one additional authentication credential.

4. The apparatus of claim 1, wherein the visitation history comprises time information indicating when the customer typically visits the financial institution location; and
 wherein determining whether the current visit falls within the recognized visitation pattern comprises comparing a time, date, and/or day of a week associated with the current visit and the time information.

5. The apparatus of claim 1, wherein the visitation history comprises transaction information indicating an amount of a transaction conducted when the customer visits the financial institution location; and
 wherein determining whether the current visit falls within the recognized visitation pattern comprises comparing a transaction amount associated with the current visit and the transaction information.

6. A method for receiving a token from a wearable device carried by a customer, the token for user authentication based on a visitation pattern of the customer, the method comprising:
 receiving, at an apparatus proximate a financial institution location and from the wearable device carried by the customer, the token comprising user authentication information associated with the customer, wherein receiving the token indicates a current visit of the customer to the financial institution location;
 receiving, by the apparatus, financial transaction limitation information indicating at least one limitation on transactions performed with the token from the wearable device carried by the customer;
 accessing, by the apparatus and based at least in part on the user authentication information, a visitation history from a customer profile associated with the customer;
 determining, by the apparatus and based at least in part on the visitation history, whether the current visit falls within a recognized visitation pattern;
  if so, determining that a required level of authentication for the current visit is a soft level of authentication, wherein the soft level of authentication is one of a plurality of levels of authentication comprising a continuum of authentication; and
  if not, determining that the required level of authentication for the current visit is a hard level of authentication, wherein the hard level of authentication is one of the plurality of levels of authentication comprising the continuum of authentication and wherein the hard level of authentication requires full authentication credentials;
 receiving a request to perform a financial transaction from the customer;
 determining that the requested financial transaction exceeds the at least one limitation indicated by the financial transaction limitation information;
 in response to determining that the requested financial transaction exceeds the at least one limitation, identify that the requested financial transaction qualifies for an exception to the at least one limitation indicated by the financial transaction limitation information based on at least one of:
  identifying that a number of days between a current real-time date and an expiration date of the token is less than a predetermined limit; and
  identifying that a category of the requested financial transaction is within a predetermined list of categories; and
 in response to determining that the requested financial transaction qualifies for the exception, authenticating, by the apparatus and based at least in part on the determination, the customer to initiate the financial transaction at the financial institution location.

7. The method of claim 6, wherein the current visit falls within the recognized visitation pattern; and wherein determining that the current visit requires the soft level of authentication comprises determining a zero level of authentication wherein the soft level of authentication requires no additional credentials.

8. The method of claim 6, wherein the current visit falls within the recognized visitation pattern; wherein determining the soft level of authentication comprises determining the soft level of authentication requires authentication that is less than a full level of authentication; and wherein the soft level of authentication requires at least one additional authentication credential.

9. The method of claim 6, wherein the visitation history comprises time information indicating when the customer typically visits the financial institution location; and
 wherein determining whether the current visit falls within the recognized visitation pattern comprises comparing a time, date, and/or day of a week associated with the current visit and the time information.

10. The method of claim 6, wherein the visitation history comprises transaction information indicating an amount of a transaction conducted when the customer visits the financial institution location; and
 wherein determining whether the current visit falls within the recognized visitation pattern comprises comparing a transaction amount associated with the current visit and the transaction information.

11. A computer program product for receiving a token from a wearable device carried by a customer, the token for user authentication based on a visitation pattern of the customer, the computer program product comprising a non-transitory computer-readable medium comprising code causing a first apparatus to:
 receive, from the wearable device carried by the customer, the token comprising user authentication information associated with the customer, wherein receiving the token indicates a current visit of the customer to the financial institution location;
 receive, from the wearable device carried by the customer, financial transaction limitation information indicating at least one limitation on transactions performed with the token;
 access, based at least in part on the user authentication information, a visitation history from a customer profile associated with the customer;
 determine, based at least in part on the visitation history, whether the current visit falls within a recognized visitation pattern;
  if so, determine that a required level of authentication for the current visit is a soft level of authentication, wherein the soft level of authentication is one of a plurality of levels of authentication comprising a continuum of authentication; and
  if not, determine that the required level of authentication for the current visit is a hard level of authentication, wherein the hard level of authentication is one of the plurality of levels of authentication comprising the continuum of authentication and wherein the hard level of authentication requires full authentication credentials;
 receive a request to perform a financial transaction from the customer;

determine that the requested financial transaction exceeds the at least one limitation indicated by the financial transaction limitation information;

in response to determining that the requested financial transaction exceeds the at least one limitation, identify that the requested financial transaction qualifies for an exception to the at least one limitation indicated by the financial transaction limitation information based on at least one of:

identifying that a number of days between a current real-time date and an expiration date of the token is less than a predetermined limit; and identifying that a category of the requested financial transaction is within a predetermined list of categories; and in response to determining that the requested financial transaction qualifies for the exception, authenticate, based on the required level of authentication, the customer to initiate the financial transaction at the financial institution location.

12. The computer program product of claim 11, wherein the visitation history comprises time information indicating when the customer typically visits the financial institution location; and wherein determining whether the current visit falls within the recognized visitation pattern comprises comparing a time, date, and/or day of a week associated with the current visit and the time information.

13. The computer program product of claim 11, wherein the visitation history comprises transaction information indicating an amount of a transaction conducted when the customer visits the financial institution location; and wherein determining whether the current visit falls within the recognized visitation pattern comprises comparing a transaction amount associated with the current visit and the transaction information.

14. The computer program product of claim 11, wherein the current visit falls within the recognized visitation pattern; and wherein determining that the current visit requires the soft level of authentication comprises determining a zero level of authentication wherein the soft level of authentication requires no additional credentials.

15. The computer program product of claim 11, wherein the current visit falls within the recognized visitation pattern; wherein determining the soft level of authentication comprises determining the soft level of authentication requires authentication that is less than a full level of authentication; and wherein the soft level of authentication requires at least one additional authentication credential.

* * * * *